(12) United States Patent
Nunziata et al.

(10) Patent No.: US 11,580,143 B1
(45) Date of Patent: Feb. 14, 2023

(54) INTERACTIVE AND DYNAMIC TIMELINE DATA MERGING AND MANAGEMENT

(71) Applicant: Resynque, Inc., Lewes, DE (US)

(72) Inventors: Maritsa C. Nunziata, Allendale, NJ (US); Jeffrey S. Phillips, Poinciana, FL (US); Serena M. Chechile, Uxbride, MA (US); Gina M. Doyle, Uxbride, MA (US)

(73) Assignee: Resynque, Inc., Lewes, DE (US)

( * ) Notice: Subject to any disclaimer, the term of this patent is extended or adjusted under 35 U.S.C. 154(b) by 0 days.

(21) Appl. No.: 17/829,842

(22) Filed: Jun. 1, 2022

(51) Int. Cl.
| | | |
|---|---|---|
| *G06F 16/31* | (2019.01) | |
| *G06F 16/11* | (2019.01) | |
| *G06F 16/35* | (2019.01) | |
| *G06Q 50/16* | (2012.01) | |
| *G06Q 50/18* | (2012.01) | |

(52) U.S. Cl.
CPC ............ *G06F 16/31* (2019.01); *G06F 16/113* (2019.01); *G06F 16/358* (2019.01); *G06Q 50/167* (2013.01); *G06Q 50/188* (2013.01)

(58) Field of Classification Search
None
See application file for complete search history.

(56) References Cited

U.S. PATENT DOCUMENTS

| | | | |
|---|---|---|---|
| 9,823,818 B1* | 11/2017 | Ryan | G06F 3/04842 |
| 2002/0103669 A1* | 8/2002 | Sullivan, Sr. | G06Q 50/167 |
| | | | 705/316 |
| 2008/0091700 A1* | 4/2008 | Brotherson | G06F 40/186 |
| | | | 707/999.102 |
| 2013/0055106 A1* | 2/2013 | Tarneberg | G06Q 10/109 |
| | | | 715/753 |
| 2018/0173372 A1* | 6/2018 | Greenspan | G06T 11/206 |
| 2018/0374171 A1* | 12/2018 | Aizen | G06Q 50/167 |
| 2019/0121865 A1* | 4/2019 | Maas | H04L 67/1095 |
| 2021/0319409 A1* | 10/2021 | Photowat | G06Q 10/063118 |
| 2021/0398204 A1* | 12/2021 | Sukur | G06Q 40/00 |

* cited by examiner

*Primary Examiner* — Matthew J Ellis
(74) *Attorney, Agent, or Firm* — Patterson + Sheridan, LLP

(57) ABSTRACT

Techniques for improved data services are provided. Upon receiving a first request from a first client, a first timeline comprising a first plurality of events for an asset indicated in the first request is generated. Upon receiving a second request from a second client, a second timeline comprising a second plurality of events is generated. A first submission for the asset is provided to the first client, comprising updating a first graphical user interface (GUI) output on a first device of the first client. Upon determining that the first client approved the first submission, a merged timeline is generated based on the first and second timelines, where the merged timeline includes the first and second pluralities of events, comprising: updating the first GUI output on the first device, and a second GUI output on a second device of the second client, to indicate the merged timeline.

16 Claims, 10 Drawing Sheets

US 11,580,143 B1

INTERACTIVE AND DYNAMIC TIMELINE DATA MERGING AND MANAGEMENT

INTRODUCTION

Embodiments of the present disclosure relate to data management. More specifically, embodiments of the present disclosure relate to dynamic management, evaluation, and merging of timeline data.

In modern computing systems, a wide variety (and vast amount) of data is often maintained for storage, searching, analysis or evaluation, and the like. The specific data structures and content vary across deployments, but overarching problems with modern data management include the tremendously voluminous number and variety of data objects, as well as the complex and opaque interactions and relationships among objects. These concerns are multiplied when data timelines are involved, such as where data can change over time (often with equally changing relationships based at least in part on the specific point in time). Conventional data management platforms fail to adequately handle these relationships and changes at scale, causing significant storage and computational inefficiency, as well as reduced computer functionality through inadequate data management.

Improved systems and techniques for data merging and management are needed.

SUMMARY

According to one embodiment presented in this disclosure, a method is provided. The method includes: in response to receiving a first request from a first client, generating, by a transaction server, a first timeline comprising a first plurality of events for an asset indicated in the first request; in response to receiving a second request from a second client, generating, by the transaction server, a second timeline comprising a second plurality of events; providing, to the first client and from the second client, a first submission for the asset, comprising updating a first graphical user interface (GUI) output on a first device of the first client; and in response to determining that the first client approved the first submission, generating, by the transaction server, a merged timeline based on the first and second timelines, wherein the merged timeline includes the first and second pluralities of events, comprising: updating the first GUI output on the first device to indicate the merged timeline; and updating a second GUI output on a second device of the second client to indicate the merged timeline.

According to one embodiment presented in this disclosure, a non-transitory computer-readable storage medium is provided. The non-transitory computer-readable storage medium comprises computer-readable program code that, when executed using one or more computer processors, performs an operation that includes: in response to receiving a first request from a first client, generating, by a transaction server, a first timeline comprising a first plurality of events for an asset indicated in the first request; in response to receiving a second request from a second client, generating, by the transaction server, a second timeline comprising a second plurality of events; providing, to the first client and from the second client, a first submission for the asset, comprising updating a first graphical user interface (GUI) output on a first device of the first client; and in response to determining that the first client approved the first submission, generating, by the transaction server, a merged timeline based on the first and second timelines, wherein the merged timeline includes the first and second pluralities of events, comprising: updating the first GUI output on the first device to indicate the merged timeline; and updating a second GUI output on a second device of the second client to indicate the merged timeline.

According to one embodiment presented in this disclosure, a system comprising one or more computer processors and logic encoded in a non-transitory medium is provided. The logic is executable by operation of the one or more computer processors to perform an operation that includes: in response to receiving a first request from a first client, generating, by a transaction server, a first timeline comprising a first plurality of events for an asset indicated in the first request; in response to receiving a second request from a second client, generating, by the transaction server, a second timeline comprising a second plurality of events; providing, to the first client and from the second client, a first submission for the asset, comprising updating a first graphical user interface (GUI) output on a first device of the first client; and in response to determining that the first client approved the first submission, generating, by the transaction server, a merged timeline based on the first and second timelines, wherein the merged timeline includes the first and second pluralities of events, comprising: updating the first GUI output on the first device to indicate the merged timeline; and updating a second GUI output on a second device of the second client to indicate the merged timeline.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
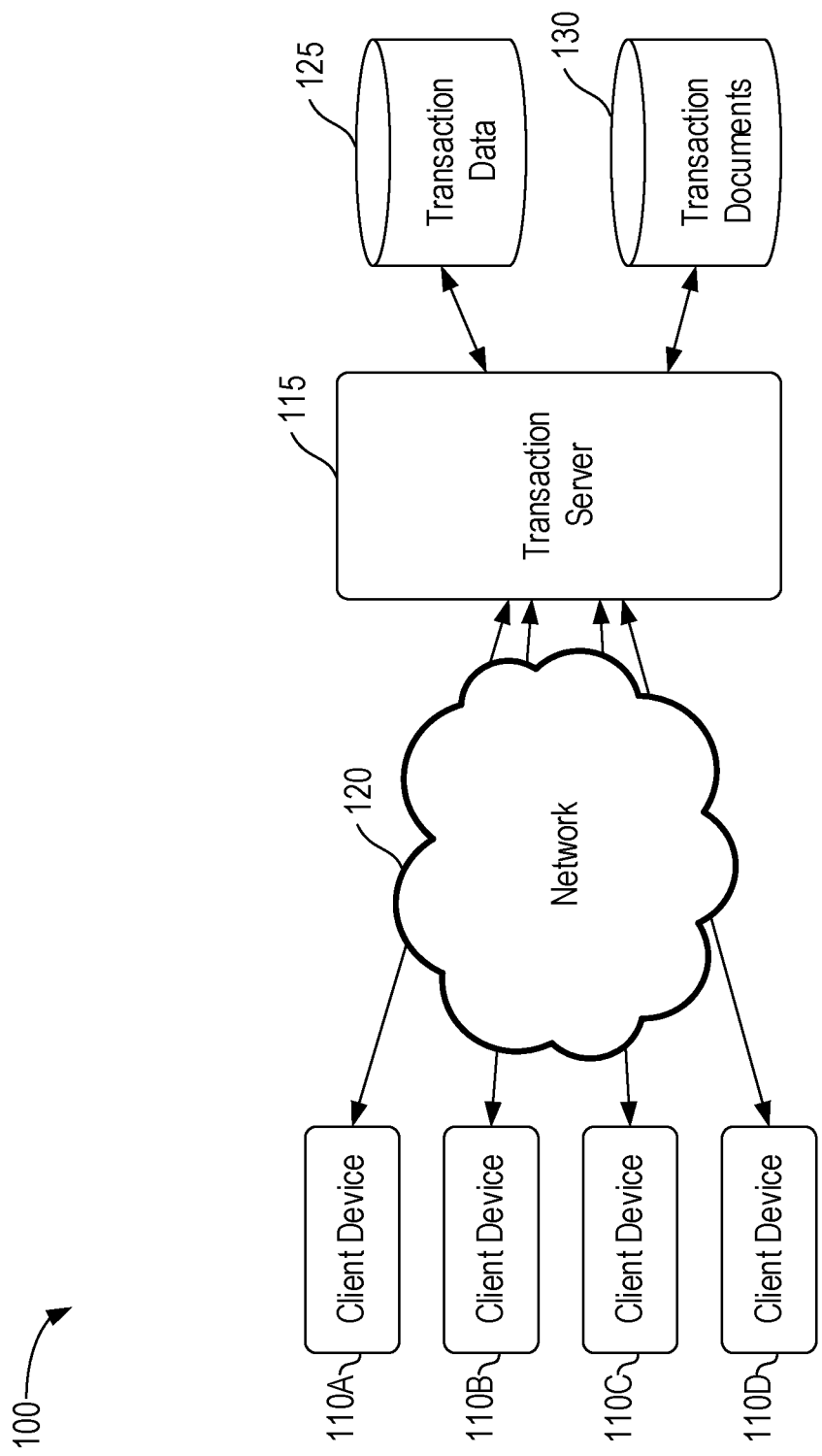
FIG. 1 depicts an example environment for dynamic timeline management.

Aspects of the present disclosure provide apparatuses, methods, processing systems, and computer-readable mediums for improved timeline data management. In some embodiments, techniques are provided to dynamically manage, merge, and split data, including data timelines, associated with multiple clients in an overarching data management platform (which may include a variety of local or remote storage solutions). In some examples discussed herein, real estate transactions are discussed as example environments where aspects of the present disclosure can provide improved computational efficiency through enhanced data management. However, aspects of the present disclosure are readily applicable to a wide variety of data management and storage deployments.

In an embodiment, a transaction server is used to manage data associated with a variety of clients (also referred to as users). In some embodiments, the transaction server generates and maintains a corresponding timeline for each user, and automatically populates each timeline with appropriate and dynamic data and other elements depending on the context of the specific client and time. As used herein, a timeline is generally represented as a time-series, where each point in time has a corresponding set of data (and where any given piece of data may be associated with multiple points on a timeline and/or multiple timelines).

For example, suppose a first client wishes to sell a real estate parcel. In one embodiment, a timeline is generated for the client, and data such as a unique timeline identifier, a unique client identifier, a unique agent identifier (or other user, if any other users are associated with the parcel or sale), a unique asset identifier (e.g., to identify the real estate parcel), and the like can be added to the timeline. In some embodiments, the transaction server can additional generate a set events for the timeline based on the current context of the timeline/client. For example, for the selling client, the transaction server may generate events such as taking photographs of the property, scheduling landscaping or staging help, and the like. In some embodiments, these events are generated from a defined set of alternative events (e.g., defined by an administrator), and are selected and applied in a context-specific manner based on the client's identity, the current stage of the timeline, and the like.

In some embodiments, in addition to managing individual timelines, the transaction server can dynamically merge and split timelines for multiple clients. For example, if a buying client makes an offer that is accepted by a selling client, the transaction server may generate a merged timeline that includes one or more shared data assets (e.g., a shared link or pointer to the offer document) as well as one or more individual data assets (e.g., a private link or pointer to the buyer's financing documents). This usage of shared data assets across individuals associated with the merged timeline can reduce the memory footprint of the system, improve access latency, and ensure data consistency. In these ways, aspects of the present disclosure can significantly improve the functionality and efficiency of data management systems. In some embodiments, events and actions that affect the merged timeline can be pushed in real-time to each affected client (e.g., using a bidirectional communication protocol such as WebSocket). Further, in the event that the merged timeline terminates (e.g., because the buyer or seller cancel the contract), the transaction server can dynamically split the timeline into discrete and individual timelines, as before the merger.

Additionally, in at least one embodiment, upon conclusion of a merged timeline (e.g., at closing, when the real property is legally passed to the buyer), the transaction server can perform a variety of processes to reduce computational load on the system, improve data retention, and generally enhance the operations of the transaction server itself. For example, in one embodiment, the transaction server can automatically retrieve the relevant documents or other data associated with the transaction, compress it using one or more compression techniques, and/or archive the (potentially compressed) data (e.g., to a secondary or remote storage). This dynamic compression and movement of data can reduce the storage and memory footprint needed on the transaction server, as well as reduce the computational overhead of evaluating and managing the remaining (non-archived) data. In these ways, aspects of the present disclosure can significantly improve the functionality and efficiency of data management systems.

Example Environment for Dynamic Timeline Management

FIG. 1 depicts an example environment 100 for dynamic timeline management. In the illustrated environment, a set of client devices 110A-D are communicatively coupled with a transaction server 115 via a network 120. Although the illustrated example includes four client devices 110, there may generally be any number of client devices in a given environment. Additionally, though a single transaction server 115 is depicted for conceptual clarity, in some embodiments, there may be multiple such transaction servers (or the operations of the transaction server 115 may be distributed across multiple systems). Further, though depicted as a discrete system for conceptual clarity, in some embodiments, the operations of the transaction server 115 may be implemented using hardware, software, or a combination of hardware and software (e.g., as one or more applications executing on one or more virtual machines in a cloud deployment).

The client devices 110 generally correspond to any computing device used by a user or client as part of a transaction or data management. For example, the client devices may include smartphones, laptop computers, desktop computers, tablets, smart watches or other wearables, and the like. In an embodiment, each client device 110 may have wireless or wired communication interfaces enabling each to be communicatively coupled with one or more other devices or systems (such as the transaction server 115) via network 120. For example, the client device 110A may use a wireless local area network (WLAN) interface to connect to a local wireless network (e.g., a WiFi network). The network 120 can generally include any number and combination of networks, including local networks, wired networks, wireless networks, and the like. In at least one embodiment, the network 120 includes the Internet.

In an embodiment, users can use the client devices 110 to transmit timeline requests to the transaction server 115 (e.g., requesting that a timeline be generated), to provide data or other updates for the timelines (e.g., to mark an event as completed, or to provide biographical data), to interact with other timelines or users of the transaction server 115, and the like.

As discussed below in more detail, the transaction server 115 is generally configured to store, maintain, evaluate, merge, split, and otherwise manage data for the users of the client devices 110. In the illustrated example, the transaction server 115 is communicatively coupled with a data store for transaction data 125, and a data store for transaction documents 130. Although depicted as residing external to the transaction server 115, in some embodiments, some or all of the transaction data 125 and transaction documents 130 are stored internally by the transaction server 115. In at least one embodiment, data associated with active timelines can be stored locally by the transaction server 115 (e.g., in memory or storage), while closed or expired timelines are stored in one or more remote repositories (e.g., archival repositories).

In one embodiment, the transaction data 125 can generally include timeline data for any number of timelines. For example, the transaction data 125 may store a set of timeline records or data objects, where each such record includes a variety of data such as identifier(s) of the associated user(s) (and/or client device(s) 110), identifiers of any related timelines, pointers to any data or documents that are relevant for the timeline, and the like. The transaction documents 130 can generally include documents for the timelines, such as financing documentation, closing documentation, client profiles, and the like. In some embodiments, each timeline in the transaction data 125 includes pointers to the relevant data in the transaction documents 130.

In some embodiments, as updates or changes are made to the transaction data 125, the transaction server 115 can determine the relevant users, identify the corresponding user devices 110, and push updates to each such device. For example, suppose client device 110A corresponds to a seller, client device 1106 is used by the seller's agent, client device 110C is used by the buyer, and client device 110D is used by the buyer's agent. Suppose further that the buyer's agent (using client device 110C) indicates that a given event (e.g., completing an appraisal of the property) has been completed. In an embodiment, once the transaction server 115 updates the corresponding transaction data 125 and/or transaction documents 130, it can dynamically identify the client devices 110A, 1108, and 110D, and transmit an alert, message, or other notification to each such device.

In at least one embodiment, the transaction server 115 can maintain a bidirectional communication protocol to the client devices 110 (e.g., a WebSocket), as compared to a conventional unidirectional connection. Using such open communication links, the transaction server 115 can push updates to the client devices 110 dynamically, rather than waiting for the client device 110 to request an update. For example, if the seller is currently using the client device 110A to view the ongoing timeline, the transaction server 115 may push an update that the appraisal has been completed, highlighting this update on a graphical user interface (GUI) of the client device 110A.

In some embodiments, when timelines are merged and split, the transaction server 115 can similarly push real-time updates to each affected client device 110. For example, when the client device 110C transmits a purchase offer (also referred to as a request or submission) to the transaction server 115, the transaction server 115 can identify the corresponding seller and associated users (e.g., agents) based on the asset identifier included with the request/offer. The transaction server 115 can then push alerts to the client devices 110A and 1108, allowing them to review and accept or decline the offer.

In some embodiments, when an offer or submission is accepted, the transaction server 115 can automatically identify all other pending submissions that name the same asset identifier, and automatically terminate or reject these other offers. In doing so, the transaction server 115 may transmit similar notifications to each affected client device 110, informing them that their submission was rejected.

Additionally, upon receiving the acceptance, the transaction server 115 may dynamically generate a merged timeline for the seller and buyer, as discussed in more detail below. This merged timeline can similarly be pushed to the affected users (e.g., client devices 110A and 110C), allowing each to immediately review the updated timeline, newly-generated events, and the like.

In at least one embodiment, as discussed below in more detail, the transaction server 115 can additionally respond to document requests (also referred to as request for transaction summaries) based on the transaction data 125 and transaction documents 130. For example, when a client device 110 requests a summary of a timeline to which they have access (e.g., a timeline that names the user and/or client device 110 as a relevant or allowed user), the transaction server 115 can dynamically identify and retrieve the relevant documents and data for the timeline, generate a summary of the timeline, and return the documents and summary to the requesting client device 110.

Embodiments of the present disclosure generally provide improved techniques for managing data among different structures (e.g., timelines) for a variety of client devices 110, using a combination of individual data and shared data that can reduce the memory and storage requirements of the transaction server 115, reduce the latency and computational expense of operating on and maintaining the data, and generally improve the functionality of the transaction server 115. For example, by selectively using pointers to shared assets (rather than duplication assets), the transaction server 115 can reduce its storage needs while ensuring that the data remains synchronized across users.

Example Workflow for Dynamic Merging and Management of Timeline Data

Figure 2A:
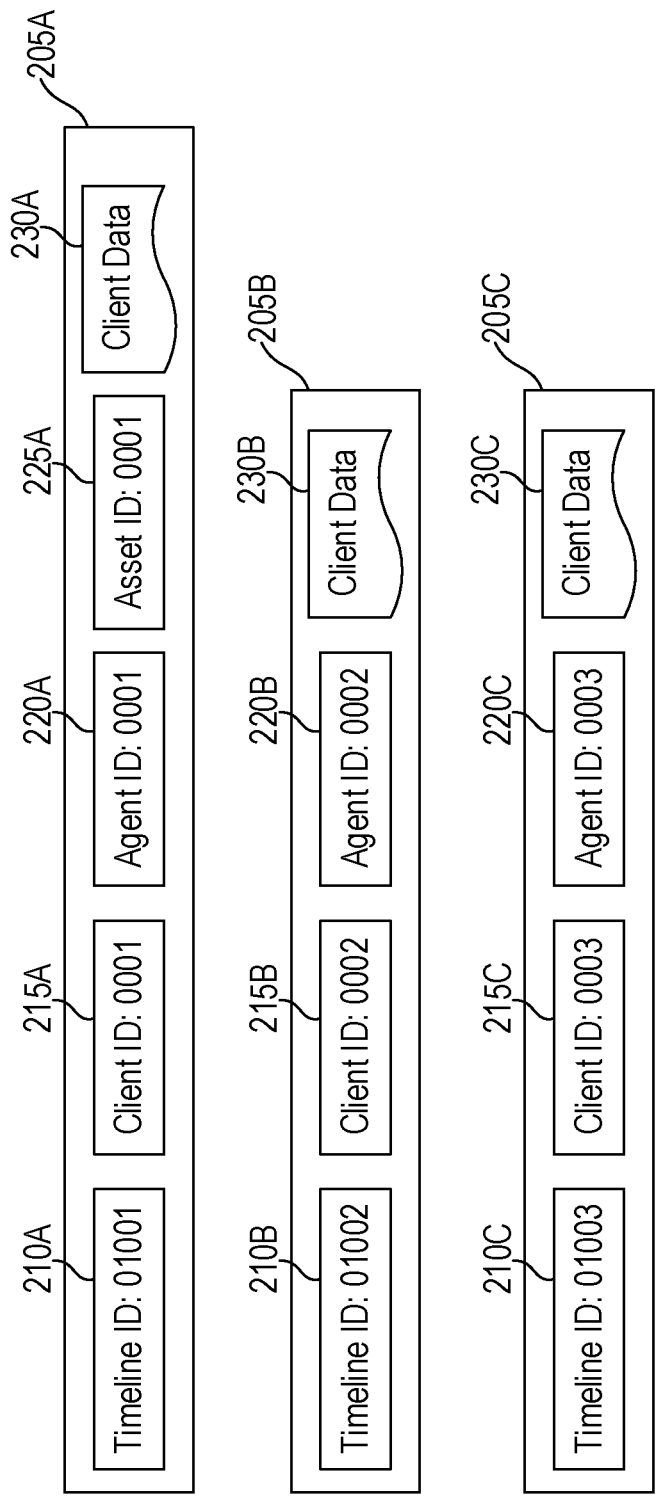
FIGS. 2A, 2B, and 2C depict an example workflow for dynamic merging and management of timeline data.
Figure 2B:
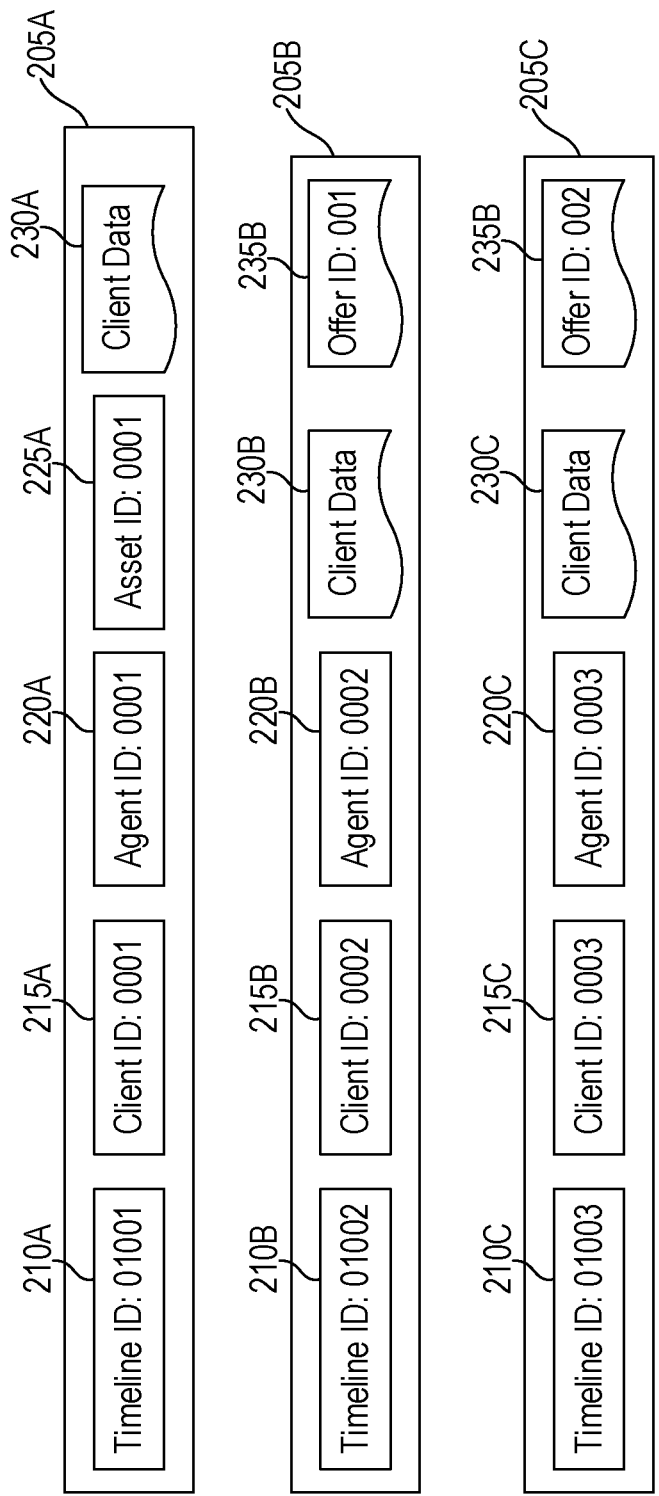
Figure 2C:
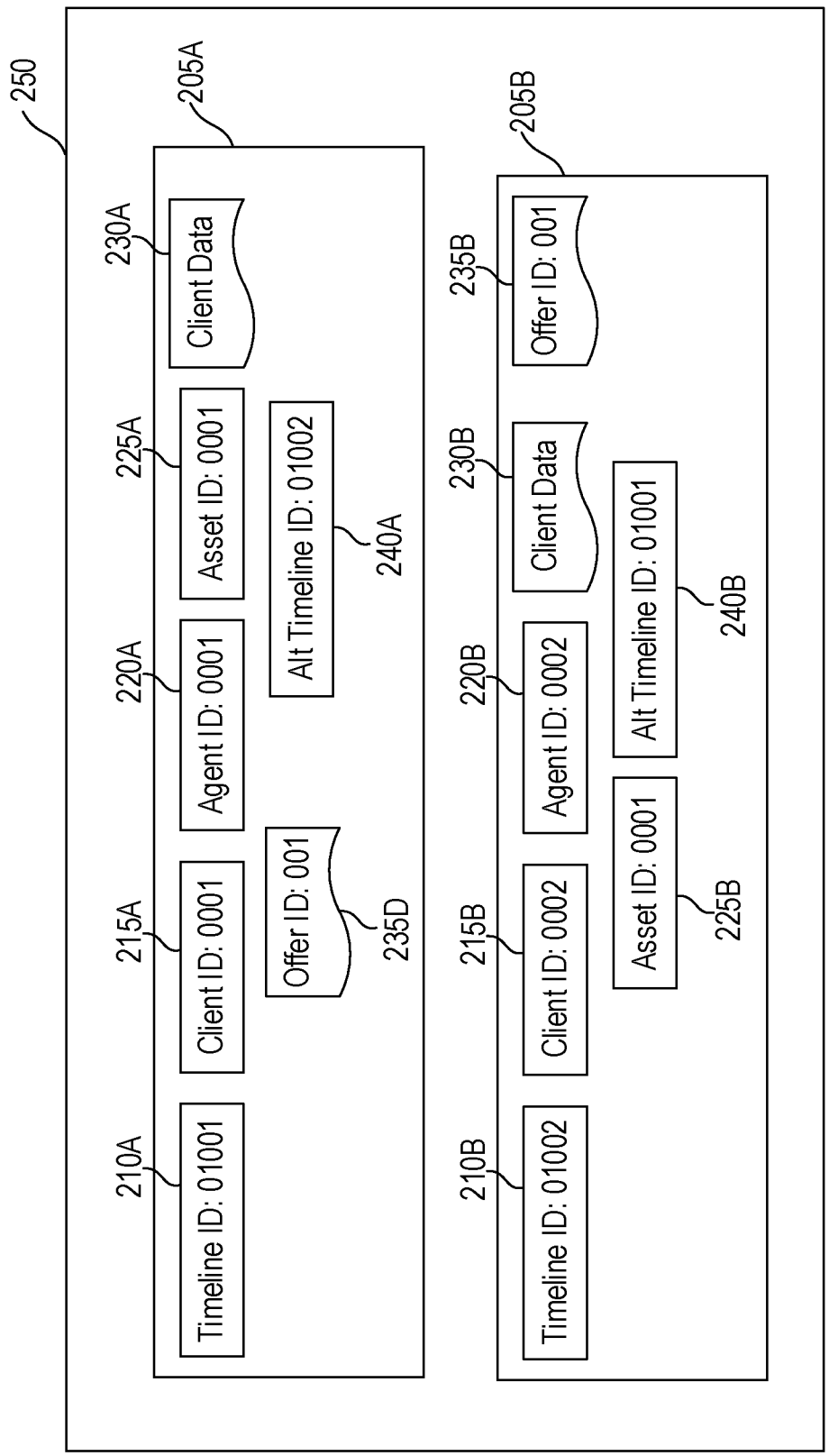

FIGS. 2A, 2B, and 2C depict an example workflow for dynamic merging and management of timeline data. In some embodiments, the dynamic merging and management is performed by a transaction server, such as transaction server 115 of FIG. 1.

FIG. 2A depicts a set of three timelines 205A, 205B, and 205C. As discussed above, each timeline 205 is generally a data structure generated on behalf of a user or client to enable efficient management and use of data, such as relating to a real estate transaction. Each timeline 205 generally includes associated data. The data associated with each timeline 205 may be stored as part of the data structure itself (e.g., in the timeline 205), and/or elsewhere (e.g., where the timeline 205 has a pointer or link to the data).

In the illustrated example, the timeline 205A corresponds to a selling user (e.g., a client who owns real property and wishes to sell it), while the timelines 205B and 205C correspond to purchasing users (e.g., clients who wish to purchase real property). In one embodiment, the transaction server generates each timeline 205 upon receiving a request, from a client, indicating the desire to begin searching or engaging in such transactions. For example, if a user indicates that they wish to sell a real property asset, the transaction server may automatically generate a timeline such as timeline 205A. Similarly, when a user indicates that they wish to begin looking for real property to purchase, the transaction server may automatically generate a timeline such as timelines 205B or 205C.

As illustrated, each timeline 205 includes a corresponding timeline identifier 210, client identifier 215, agent identifier 220, and client data 230. Although depicted as being stored within the timeline 205 itself for conceptual clarity, as discussed above, some or all of the data may be stored in other repositories. For example, the timeline data structure may store elements such as the timeline identifier 210 and client identifier 215 locally, while elements such as the client data 230 may be stored in one or more other repositories (where the timeline data structure includes a pointer to the data).

Generally, the timeline identifier 210 is a unique identifier that can be used, by the transaction server, to manage timelines and identify the corresponding information for each. For example, the transaction server may automatically generate a timeline identifier 210 upon receiving a request to generate a timeline (e.g., using a random or pseudo-random value, incrementing a counter, and the like). The client identifier 215 is similarly a unique identifier that can be used to specifically identify the client (or other user) associated with the timelines 205. For example, the client identifier 215A may uniquely identify the seller for whom the timeline 205A was generated. In some embodiments, the transaction server can similarly generate a client identifier 215 for each user when the timeline request is received.

Although the illustrated example depicts a single client identifier 215 for each timeline 205, in some embodiments, there may be multiple client identifiers 215 associated with a given timeline 205. For example, there may be multiple owners/sellers of the real property (where each owner has a corresponding client identifier 215 included in the timeline 205). In some embodiments, other users associated with the transaction or property may similarly be included as needed. For example, a surveyor hired to survey the property may have a client identifier 215 linked to the timeline 205, a contractor hired to repair the property may have a corresponding client identifier 215, a lawyer hired to prepare the deed may have a corresponding client identifier 215, and the like.

In some embodiments, the client identifiers 215 are dynamically linked to or included in the timeline 205 depending on their roles and the context of the timeline 205. That is, client identifiers 215 may be added to the timeline 205 when they become relevant (e.g., when the landscaper is hired to prepare the property for sale), and may be removed when they are no longer relevant (e.g., when they complete the job, or when they are terminated). In some embodiments, even if a client identifier 215 (or other data) is removed from the current instance of the timeline 205, the transaction server maintains a historical record of the changes in the timeline 205 over time. For example, each time a change occurs, the transaction server may preserve or archive a copy of the current timeline 205 (just before the change), and link this historical timeline to the new revised timeline 205 (with the changes made).

In the illustrated example, each timeline 205 also includes an agent identifier 220. In one embodiment, the agent identifier 220 uniquely identifies the agent associated with the client and/or timeline 205. For example, the agent identifier 220A may correspond to the seller's agent, while the agent identifiers 220B and 220C identify buyer's agents. Although the illustrated example, includes an agent identifier 220 for each timeline 205, in some embodiments, this is an optional field and there may be no agent associated with any given timeline 205. That is, buyers and sellers may generate and use their own timelines 205 and transact without the assistance of any agents. Additionally, though depicted as an agent identifier 220, in some aspects, the agent is identified using a client identifier 215, as discussed above.

As illustrated, the timeline 205A also includes an asset identifier 225A. In an embodiment, the asset identifier 225A uniquely identifies the asset being offered as part of the timeline 205. For example, in the case of real property, the asset identifier 225A uniquely identifies the property. In some embodiments, the transaction server generates an asset identifier 225 when the timeline 205 is created (or when the seller indicates the property). For example, the transaction server may generate a random, pseudo-random, or counter-based value to serve as the asset identifier 225. In some embodiments, the asset identifier 225 corresponds to or includes one or more other descriptions or identifiers for the asset. For example, the asset identifier 225 may include information such as the legal definition of the property, the parcel number, the physical address, the coordinates, and the like. In a related embodiment, the asset identifier 225 may be used to locate or look up this data (e.g., stored in another repository).

In some embodiments, each timeline 205 can have no more than one asset identifier 225. That is, the timeline 205 may have no asset identifier 225 (e.g., if the client is a buyer) or one asset identifier 225 (e.g., if the client is a seller). In one such embodiment, if the user has multiple properties for sale, the transaction server can generate independent timelines 205, one for each such asset.

In the illustrated example, each timeline 205 is associated with corresponding client data 230. The client data 230 can generally include any variety of data associated with the client(s) and/or transactions. For example, the client data 230 may include biographical or demographics information for each client (e.g., their name, age, social security number, birthdate, or any other relevant data for the transaction). In some embodiments, the client data 230 can further include any additional documentation or other data relevant to the transaction. For example, the client data 230 may include the results of a site survey or inspection, financing documents, and the like.

Although not depicted in the illustrated example, in some aspects, the transaction server can also dynamically generate and insert relevant events to each timeline 205, as discussed below in more detail with reference to FIG. 3. These events generally include context-specific tasks, reminders, or other information. For example, the timeline 205A may receive events related to staging the property, hiring an agent, taking pictures of the property, and the like. Similarly, the timelines 205B and 205C may receive events related to securing financing and/or adding financing information, indicating preferences or desires for properties (e.g., minimum number of bedrooms), and the like.

In the illustrated example depicted in FIG. 2B, the buyer users (corresponding to timelines 205B and 205C) have each made a submission (also referred to as a purchase offer or simply an offer) to the user associated with the timeline 205A. That is, the client indicated by client identifier 215B has made a first submission (represented by offer identifier 235B in the timeline 205B), and the client indicated by client identifier 215C has made a second submission (represented by offer identifier 235C in the timeline 205C), each offering to purchase the property indicated by the asset identifier 225As. In some embodiments, the offer identifiers 235 are stored within the timeline 205 itself. In at least one embodiment, the offer identifiers 235 include links, pointers, or other information used to retrieve the details of the submission itself (e.g., stored elsewhere).

For example, the offer identifiers 235 each uniquely identify the corresponding submission, and may include, point to, or be used to locate information such as the offered price, proposed closing date, due diligence timelines, earnest money or deposit, and any other relevant elements for the offer.

In an embodiment, when an offer identifier 235 is created, the transaction server can identify the indicated property (e.g., the asset identifier 225 included in the submission). Based on this asset identifier 225, the transaction server can locate the corresponding timeline 205A. Once the timeline 205A is found, the transaction server can use the included client identifier(s) 215A to identify the appropriate client(s)

or user(s), and transmit a notification or update to each such user. Although not included in the illustrated example, in some aspects, the offer identifiers 235 are also added to the timeline 205A.

In embodiments, notifying the seller users can include a variety of operations. For example, in some aspects, the transaction server may generate and transmit an email, text message, and/or other notification (e.g., a push notification via an application on the user's device) to the identifier user(s). In at least one embodiment, as discussed above, the transaction server can use a bidirectional communication link to push real-time updates to the client devices. For example, using a WebSocket-based connection, the transaction server may automatically update a GUI on the seller's device(s) to indicate the newly-generated submissions.

Using the indicated offer identifiers 235B and 235C, in an embodiment, the user can access the underlying submission details to review and determine whether to accept or reject them each. For example, the user may click, select, or otherwise interact with the offer identifier 235 to cause the transaction server to dynamically retrieve and output the corresponding offer details via the GUI. In some embodiments, the transaction server can then use the GUI to accept, reject, or counteroffer each submission.

In the illustrated example depicted in FIG. 2C, the user associated with the timeline 205A has accepted the submission corresponding to the offer identifier 235B (provided by the user associated with the timeline 205B). In response, the transaction server automatically generates a merged timeline 250, including both the underlying timelines 205A and 205B. Although the illustrated example includes each original timeline 205 within the merged timeline 250, in some aspects, the original timelines 205 are subsumed or entirely replaced by the merged timeline 250. Additionally, though a discrete merged timeline 250 is depicted for conceptual clarity, in some embodiments, the merged timeline is represented as the combination of the individual timelines, each with an alternative timeline identifier that identifies the others.

In some embodiments, when the user accepts a submission, the transaction server can automatically identify all other submissions (e.g., other offer identifiers 235) that indicate the same asset identifier 225, and decline these other submissions. For example, the offer identifier 235C provided by the user associated with the timeline 205C has been automatically identified and declined. In at least one embodiment, the transaction server can further generate and output a notification, alert, or other message to the corresponding user(s).

In embodiments, notifying the declined user(s) can include a variety of operations. For example, in some aspects, the transaction server may generate and transmit an email, text message, and/or other notification (e.g., a push notification via an application on the user's device) to the identifier user(s). In at least one embodiment, as discussed above, the transaction server can use a bidirectional communication link to push real-time updates to the client devices. For example, using a WebSocket-based connection, the transaction server may automatically update a GUI on the buyer's device(s) to indicate that the offer has been declined.

In the illustrated example, when the offer is accepted and while generating the merged timeline 250, the transaction server adds one or more new fields or data elements to the underlying timelines 205A and 205B. Specifically, as illustrated, the transaction server can add an offer identifier 235D to the seller's timeline 205A (which has the same value as the offer identifier 235B in the timeline 205B). Similarly, the transaction server can add the asset identifier 235B (which has the same value as the asset identifier 235A) to the timeline 205B.

As illustrated, the transaction server can further add an alternative timeline identifier 240 to each timeline 205A and 205B. As illustrated, each alternative timeline identifier 240 is used to indicate the corresponding timeline of the other party. Specifically, the alternative timeline identifier 240A in the timeline 205A uniquely identifies the timeline 205B, and the alternative timeline identifier 240B in the timeline 205B uniquely identifies the timeline 205A.

By using these alternative timeline identifiers 240 as pointers, the transaction server can quickly and efficiently locate and retrieve the relevant information for each user at each point in time. That is, rather than duplicating all of the relevant data for each user, the transaction server can store a single copy of it and use the merged timeline 250 and pointers to share access to the associated data. For example, using the alternative timeline identifier 240B, the transaction server may enable the selling user to quickly review whether the buying user has completed events or tasks associated with the timeline 205B and/or merged timeline 250.

Although not included in the illustrated example, in some aspects, when the merged timeline 250 is generated, the transaction server can additionally generate a set of relevant events or tasks for the merged timeline 250. For example, a first event corresponding to completing a property appraisal can be generated and added to the merged timeline 250 and/or timeline 205B for the buying user.

In an embodiment, as discussed above, when the submission is completed (e.g., the sale closes), the transaction server can take a variety of actions for the merged timeline 250. In one such embodiment, the transaction server can retrieve the relevant documents (e.g., included in the client data 230A, client data 230B, and the like) and compress them for more efficient storage. In some embodiments, the transaction server automatically compresses the data associated with the merged timeline 250, and/or archives the merged timeline 250.

For example, the transaction server may move the data of the merged timeline 250 from a primary repository to a secondary repository. In some embodiments, the transaction server uses a primary repository that has a relatively lower access cost (e.g., low retrieval latency) for active timelines. When timelines are closed, the transaction server can compress and/or archive it to a secondary repository having a relatively higher access cost (e.g., higher latency). This can allow the transaction server to maintain active data in the primary repository and dynamically move inactive data to secondary repositories, thereby reducing the computational burden on the transaction server and ensuring that active timelines are accessible rapidly and reliably.

In some embodiments, if the submission terminates due to other reasons (e.g., due to the seller or buyer canceling the offer, the transaction server can terminate the merged timeline 250 and separate the timelines 205A and 205B into independent timelines again. In one such embodiment, in doing so, the transaction server can update the timelines 205 (e.g., by removing, or setting to a predefined or null value, the alternative timeline identifiers 240, removing the offer identifier 235D from the timeline 205A, removing the asset identifier 225B from the timeline 205B, and the like).

Example Method for Dynamic Generation and Population of Timeline Data

Figure 3:
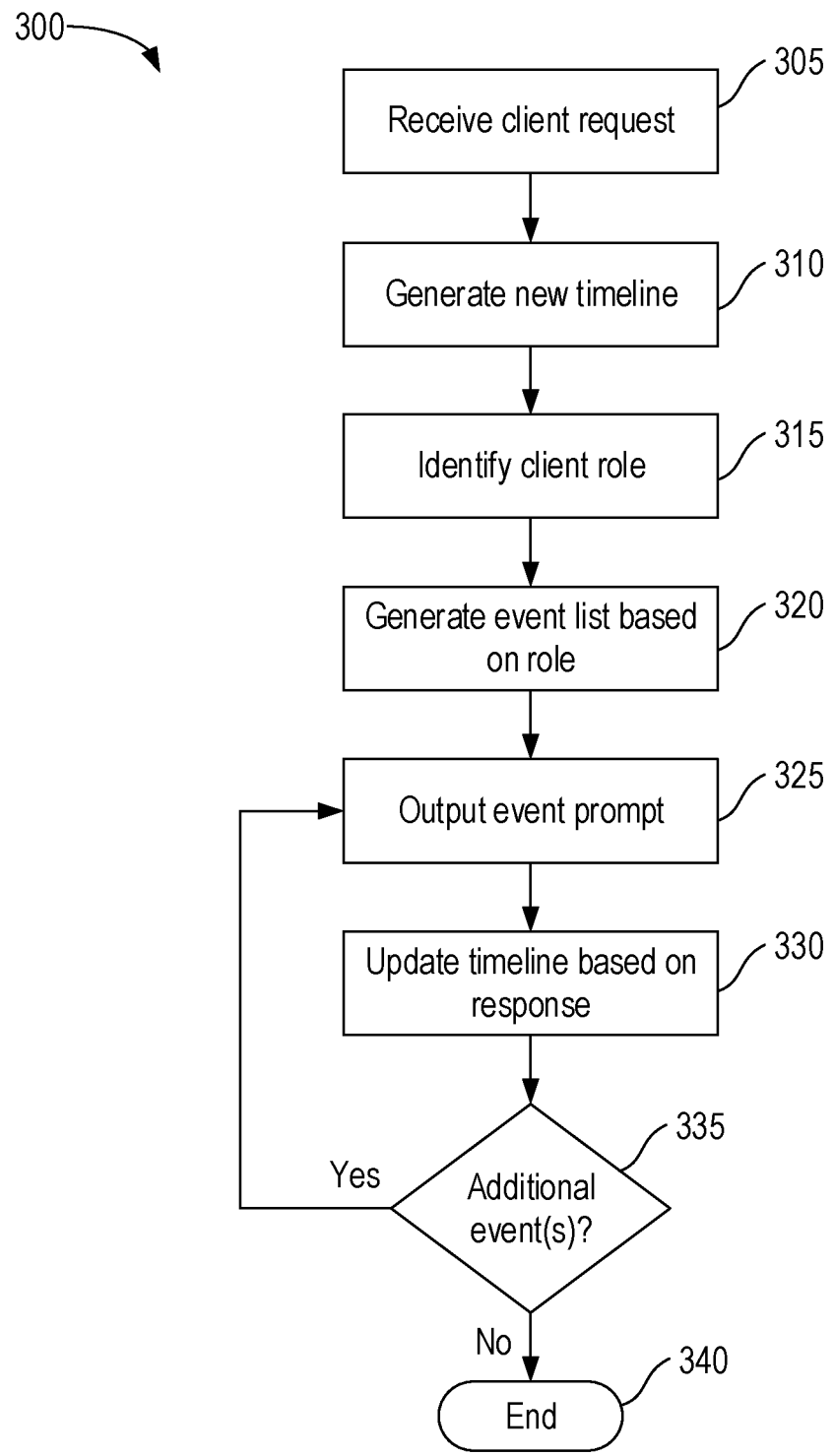
FIG. 3 is a flow diagram depicting an example method for dynamic generation and population of timeline data.

FIG. 3 is a flow diagram depicting an example method 300 for dynamic generation and population of timeline data.

In some embodiments, the method 300 is performed by a transaction server, such as the transaction server 115 of FIG. 1. In one embodiment, the method 300 provides additional detail for the initial creation and population of a timeline, such as timelines 205 of FIGS. 2A-2C.

At block 305, the transaction server receives a client request to generate a new timeline. For example, the client request may be received from a user who owns real property and desires to sell it. Similarly, the client request may be received from a user who desires to purchase real property. In some embodiments, the client request is received from a client device, such as one of the client devices 110 of FIG. 1. The request can generally include any relevant data or information, such as the role of the user (e.g., buyer or seller), an indication of the property (in the case of a selling user), optional data such as preferences for desired properties (in the case of a buying user), and the like.

In some embodiments, the client request can be received from the client themselves. That is, the buying user or selling user may personally request that a timeline be generated. In some embodiments, the client requests may be received from other users, on behalf of the transacting clients. For example, an agent may transmit the request to create a timeline on behalf of their client.

At block 310, the transaction server generates a timeline for the request. For example, as discussed above, the transaction server can generate a data structure (such as a timeline 205) to hold the relevant data for the requesting client. In an embodiment, as part of generating the timeline, the transaction server can similarly generate a unique timeline identifier for the timeline, generate a client identifier for the client (if one does not already exist, such as because the client has already registered with the transaction server for other transactions), and the like.

At block 315, the transaction server determines the role of the requesting client (or the client for whom the timeline is being created). For example, in the case of real property, the transaction server can determine whether the requesting client is a buyer or a seller. As discussed above and in more details below, the transaction server can use this client role to help determine the context of the timeline and treat it accordingly.

At block 320, the transaction server generates an event list based on the determined client role. The event list is generally a set of events, tasks, reminders, or other data elements that are relevant for the timeline based on the client role. For example, as discussed above, the generated event list for a seller may include items such as scheduling a photographer, completing any needed repairs, and the like.

In some embodiments, the transaction server generates the event list by searching a defined set of possible or alternative events. In one such embodiment, the transaction server may maintain a set of events (e.g., specified or defined by a user or administrator), each having corresponding criteria indicating when the event is applicable. For example, a given event may indicate the client role for which the event is applicable (e.g., buyer, seller, buyer's agent, seller's agent, contractor, attorney, and the like), the time when the event is applicable (e.g., before offer, after offer submission, after offer acceptance, and the like), and the like.

In some embodiments, the transaction server generates the event list based further on various characteristics or details of the timeline. For example, based on the asset identifier or other information, the transaction server can determine whether a septic inspection event should be added. Similarly, based on whether the buyer plans to finance their purchase, the transaction server can determine whether to add financing-related events.

At block 325, the transaction server outputs an event prompt from the set of generated events. For example, the transaction server may output, on the GUI of the user, an indication of the event (e.g., a textual summary), information about how to complete or otherwise satisfy the event, and the like. In some embodiments, outputting the event prompt includes adding it to a graphical representation of the generated timeline on the GUI of the user. In embodiments, outputting the event prompt can include a variety of operations. For example, in some aspects, the transaction server may generate and transmit an email, text message, and/or other notification (e.g., a push notification via an application on the user's device) to the identifier user(s). In at least one embodiment, as discussed above, the transaction server can use a bidirectional communication link to push real-time updates to the client devices. For example, using a WebSocket-based connection, the transaction server may automatically update a GUI on the buyer's device(s) to include the event.

At block 330, the transaction server can optionally update the generated timeline data structure based on the user response to the output event prompt. For example, if the user indicates that the event has been completed (e.g., the site survey was performed), the transaction server may update the timeline by marking the event as complete, removing it from the timeline, and the like. In at least one embodiment, as discussed above, the transaction server can automatically push such updates to other relevant users as appropriate. For example, if the timeline is associated with an agent user, the transaction server can push the update the agent user as well. Similarly, if the timeline is part of a merged timeline, the transaction server can push an update to the other party to the transaction. In some embodiments, if no response or update is received, the transaction server updates the timeline to include the generated event as a future item to be performed.

At block 335, the transaction server determines whether there is at least one additional event remaining, from the generated list of events, that has not yet been added to the timeline. If so, the method 300 returns to block 325 to output another event prompt. Although depicted as a sequential process (e.g., outputting each event sequentially) for conceptual clarity, some or all of the events may be output and/or added to the timeline in parallel. For example, the transaction server may update the timeline to reflect all of the generated events, allowing the user to manually select each as desired. If all of the generated events have been output and/or added to the timeline, the method 300 terminates at block 340.

Although the illustrated example depicts an instantiation process for a timeline, in embodiments, the transaction server can continuously receive updates from user(s), and update the corresponding timelines appropriately. For example, after the method 300 terminates, the transaction server may nevertheless continue to send and receive information to and from users (e.g., sending reminders to complete events, receiving input and updating the timeline accordingly, and the like) throughout the transaction.

Example Method for Dynamic Merging and Management of Timeline Data

Figure 4:
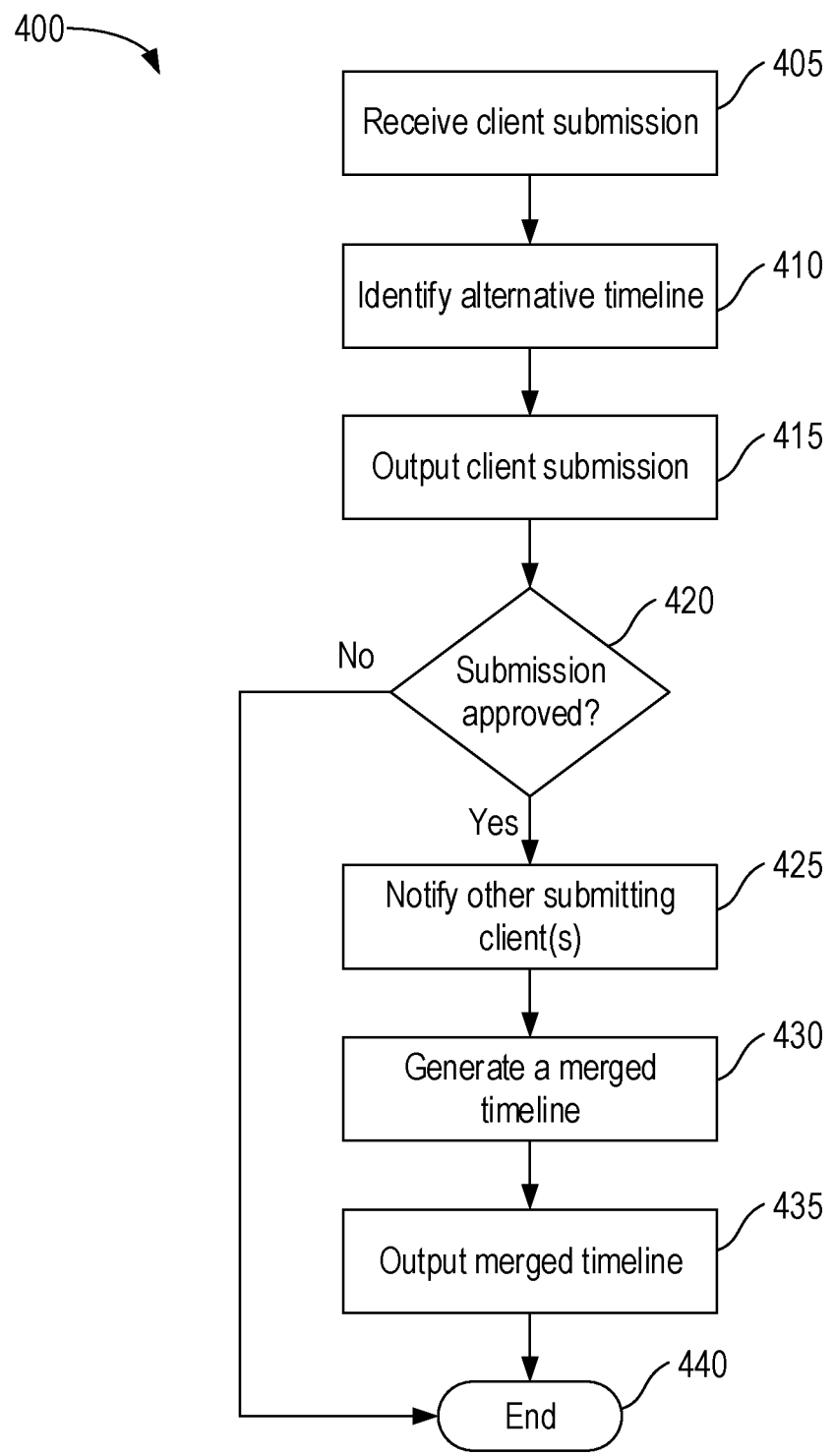
FIG. 4 is a flow diagram depicting an example method for dynamic merging and management of timeline data.

FIG. 4 is a flow diagram depicting an example method 400 for dynamic merging and management of timeline data. In some embodiments, the method 400 is performed by a transaction server, such as the transaction server 115 of FIG. 1. In one embodiment, the method 400 provides additional detail for the generation of merged timelines, such as merged timeline 250 of FIG. 2C.

At block 405, the transaction server receives a client submission (e.g., labeled using an offer identifier, such as offer identifier 235 as discussed above with reference to FIG. 2B). As discussed above, the submission can generally include a variety of terms and details for the offer, such as the proposed price, proposed closing date, proposed due diligence period, contingencies, the property in question, and the like.

At block 410, the transaction server identifies the alternative timeline for the submission. For example, based on the indicated property (e.g., an asset identifier), the transaction server can locate the corresponding timeline associated with the indicated asset identifier. That is, the transaction server may search for the timeline having the same asset identifier as indicated in the received submission. The transaction server can then identify the user(s) or client(s) associated with the identified timeline (e.g., the client identifier 215 and/or agent identifier 220).

At block 415, the transaction server outputs the received client submission to the identifier clients(s) and/or agent(s) of the identified alternative timeline. In embodiments, outputting the submission can include a variety of operations. For example, in some aspects, the transaction server may generate and transmit an email, text message, and/or other notification (e.g., a push notification via an application on the user's device) to the identifier user(s). In at least one embodiment, as discussed above, the transaction server can use a bidirectional communication link to push real-time updates to the client devices. For example, the transaction server may automatically update a GUI on the seller's device(s) to indicate the offer.

At block 420, the transaction server determines whether the submission has been approved by the seller. This may include, for example, determining whether the seller user approved it, whether the seller's agent approved it, and the like. If the offer was not approved (e.g., if it was declined or marked as deferred), the method 400 terminates at block 440. In one embodiment, the offer remains associated with the seller timeline, and the user may return later to approve or decline it. In some offers, in addition to or instead of leaving it pending, the user can return a counteroffer to the original user that provided the submission. In some embodiments, creation of such a counteroffer acts a rejection of the original offer. In other embodiments, the original offer may remain pending.

If the transaction server determines that the submission was accepted or approved, the method 400 continues to block 425, where the transaction server automatically rejects any other pending submissions for the same property, and notifies the corresponding user(s) that their submissions were declined. That is, the transaction server can identify other pending submissions that name the same asset identifier, determine the corresponding submitting user(s) of these offers, and notify them. As discussed above, this notification can generally include a wide variety of processes, including email, text, push notifications, automatic updating of a GUI, and the like.

At block 430, the transaction server generates a merged timeline for the transaction. For example, as discussed above, the transaction server may create a merged timeline (e.g., merged timeline 250 of FIG. 2C) that includes both the seller's timeline (e.g., the alternative timeline identified in block 410) and the buyer's timeline (e.g., the timeline corresponding to the user that provided the client submission).

At block 435, the transaction server then outputs the merged timeline on the relevant user devices. For example, as discussed above, the transaction server may automatically update GUIs on each relevant device (e.g., the seller device, buyer device, seller agent device, buyer agent device, and the like) indicating the merged timeline. In some embodiments, as discussed above, outputting the merged timeline includes transmitting an indication of the merged timeline to each relevant user, allowing them to review it in full. The method 400 then terminates at block 440.

Although not included in the illustrated example, in some aspects, generating the merged timeline includes generating a set of events (as discussed above with reference to FIG. 3) for the merged timeline. In some embodiments, this includes adding the existing events from each individual timeline to the merged timeline (or adding a pointer to these events). In at least one embodiment, new events may also be generated (e.g., based on the new stage or context of the timeline). For example, new events such as scheduling an appraisal may become relevant only once a submission is accepted. In an embodiment, these new events can be added to the shared timeline, enabling each relevant user to readily review the status of each.

Example Method for Dynamic Updating and Archiving of Timeline Data

Figure 5:
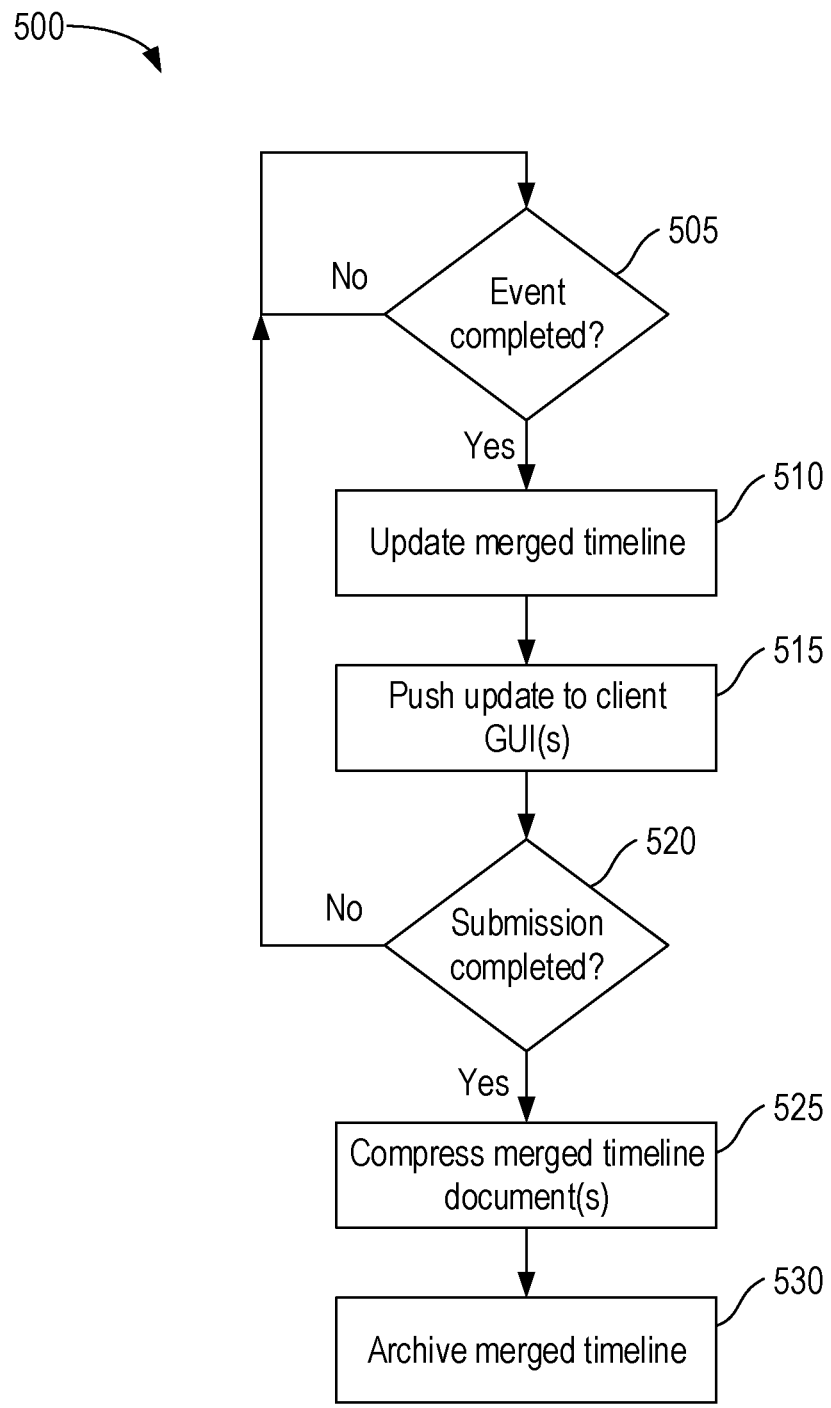
FIG. 5 is a flow diagram depicting an example method for dynamic updating and archiving of timeline data.

FIG. 5 is a flow diagram depicting an example method 500 for dynamic updating and archiving of timeline data. In some embodiments, the method 500 is performed by a transaction server, such as the transaction server 115 of FIG. 1. In one embodiment, the method 500 provides additional detail for the management and closing of merged timelines, such as merged timeline 250 of FIG. 2C.

At block 505, the transaction server determines whether any of the events on the merged timeline have been completed. For example, a user may indicate that one or more events were completed or scheduled for completion. If no events have been completed, the method 500 iterates at block 505. If the transaction server determines that an event has been completed, the method 500 continues to block 510.

At block 510, the transaction server updates the merged timeline based on the event completion. For example, as discussed above, the transaction server may update the shared merged timeline to indicate that the indicated event is complete, or to otherwise update the event with any relevant data or information (e.g., to add a copy of the inspection report to the merged timeline). As the merged timeline is a shared resource, in an embodiment, the transaction server need only maintain and update a single copy of it, thereby reducing storage and memory costs, as well as computational costs to update the data.

At block 515, the transaction server pushes the update(s) to the relevant client devices via their respective GUIs. For example, as discussed above, the transaction server may maintain a bidirectional communication link such as a WebSocket connection to the client device(s), and use this like to automatically update the client GUIs based on the event completion. In some embodiments, the transaction server can additional or alternatively transmit the updates using other techniques, such as email, text message, and the like.

At block 520, the transaction server determines whether the submission has completed. In one embodiment, this includes determining whether the detected event completion was the final event (e.g., indicating that the property transfer has closed or been completed). If the submission is not-yet complete, the method 500 returns to block 505 to monitor for further updates. If the submission is complete, the method 500 continues to block 525.

At block 525, the transaction server compresses any documents associated with the merged timeline, as discussed above. For example, the transaction server can use the merged timeline identifier and/or individual timeline identifiers of the underlying timelines to retrieve the relevant data and documentation for the merged timeline (e.g., inspection reports, closing documents, survey results, and the like). The transaction server can then compress this documentation, such that it can be stored in a smaller memory or storage footprint.

At block 530, the transaction server then archives the merged timeline and/or compressed documentation. As discussed above, in some embodiments, archiving the timeline includes transferring the data from a primary repository to a secondary repository. The secondary repository may generally have higher access costs (e.g., higher latency), larger storage availability, cheaper storage costs (e.g., lower cost per unit of data), and the like, as compared to the primary repository. In this way, the transaction server can efficiently maintain the completed timelines without losing any data, while simultaneously freeing primary repository space and computational resources for ongoing or active timelines (or new timelines), thereby improving the operations of the transaction server.

Example Method for Generating Aggregated Reports for Timeline Data

Figure 6:
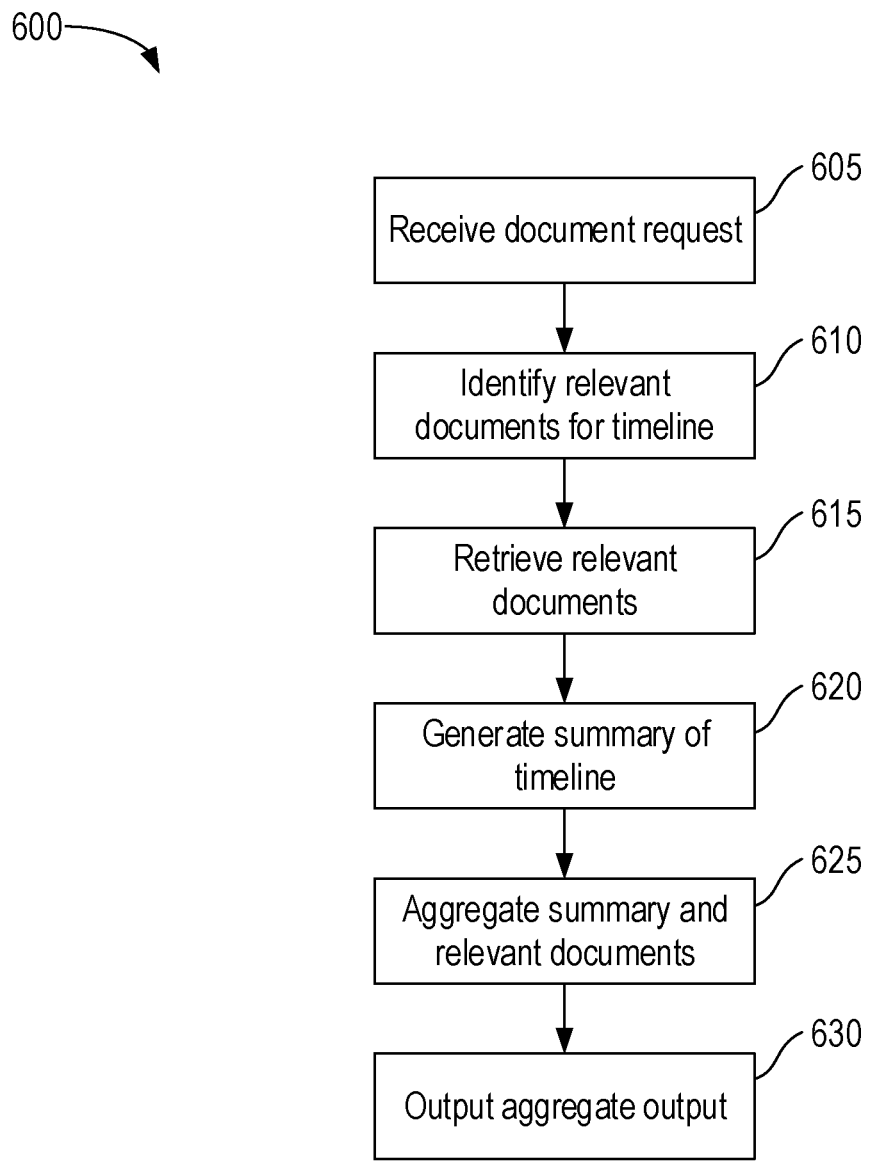
FIG. 6 is a flow diagram depicting an example method for generating aggregated reports for timeline data.

FIG. 6 is a flow diagram depicting an example method 600 for generating aggregated reports for timeline data. In some embodiments, the method 600 is performed by a transaction server, such as the transaction server 115 of FIG. 1. In one embodiment, the method 600 provides additional detail for the generation of document or transaction summaries.

At block 605, the transaction server receives a document request from a requesting user or client. In some embodiments, the clients can generate document requests at any point during the life to a timeline (which may include individual timelines, such as the timelines 205 of FIG. 2A, as well as merged timelines, such as the merged timeline 250 of FIG. 2C). In at least one embodiment, the document request is automatically generated upon completion of a timeline (e.g., when a merged timeline is closed due to completion of the submission or sale).

At block 610, the transaction server identifies the relevant documents for the timeline indicated in the document request. For example, in the case of an individual timeline, the transaction server may identify and retrieve the client data (e.g., client data 130 of FIG. 1) and any other relevant documentation or data. In at least one embodiment, the transaction server can retrieve the documentation relevant not only to the current instance of the timeline, but also the data from prior instances (e.g., documentation added during prior stages that may not be relevant or associated with the current version). In one embodiment, in the case of a merged timeline, the transaction server can identify the alternative timeline, and similarly retrieve the documents for the alternative timeline.

At block 620, the transaction server generates a summary of the timeline. In some embodiments, the summary corresponds to a brief natural language description of the timeline, such as the time and/or date when it was created, the time and/or date when it became a merged timeline, information relating to the individual client(s), the property associated with the timeline, the offer details (if present), and the like. In some embodiments, the transaction server can generate this summary by retrieving a summary template indicating various fields or data that should be included, and parsing the timeline data for the indicated information.

At block 625, the transaction server aggregates the summary and the retrieved relevant documents for the timeline. In some embodiments, aggregating the documents includes adding the contents of each to a single document (e.g., to a single file in a Portable Document Format (PDF)). In at least one embodiment, aggregating the summary and documents includes compressing them to a reduced memory footprint.

At block 630, the transaction server outputs the aggregate output (e.g., the summary and relevant documents) to the requesting user(s). In this way, the transaction server can rapidly and efficiently retrieve relevant information for the timeline using the various unique identifiers and shared resources, thereby reducing the computational expense needed to find and aggregate the information.

Example Method for Merging Timeline Data

Figure 7:
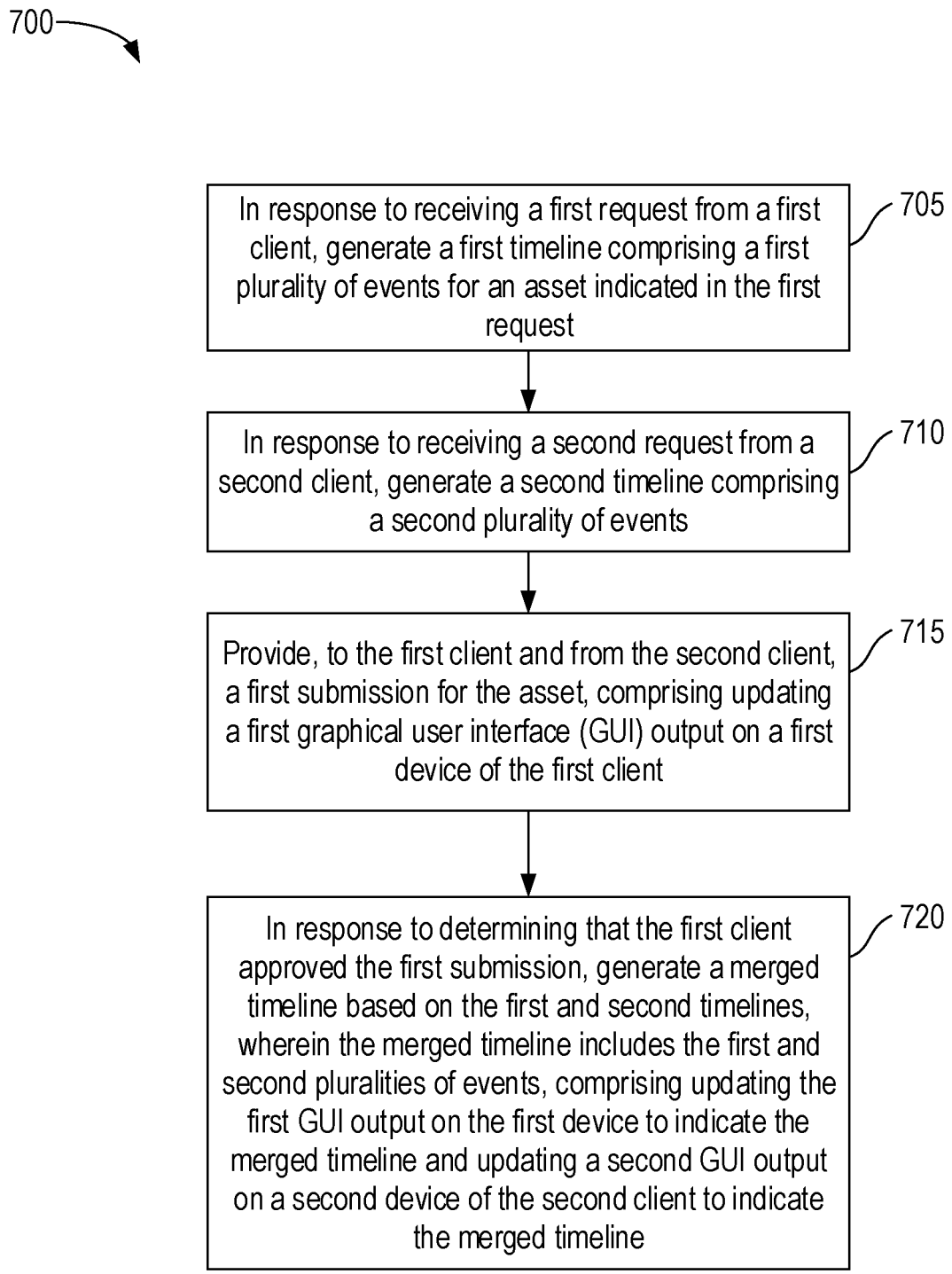
FIG. 7 is a flow diagram depicting an example method for merging timeline data.

FIG. 7 is a flow diagram depicting an example method 700 for merging timeline data. In some embodiments, the method 700 is performed by a transaction server, such as the transaction server 115 of FIG. 1.

At block 705, in response to receiving a first request from a first client, a first timeline comprising a first plurality of events for an asset indicated in the first request is generated.

At block 710, in response to receiving a second request from a second client, a second timeline comprising a second plurality of events is generated.

At block 715, a first submission for the asset is provided, to the first client and from the second client, comprising updating a first graphical user interface (GUI) output on a first device of the first client.

At block 720, in response to determining that the first client approved the first submission, a merged timeline is generated based on the first and second timelines, wherein the merged timeline includes the first and second pluralities of events, comprising updating the first GUI output on the first device to indicate the merged timeline, and updating a second GUI output on a second device of the second client to indicate the merged timeline.

Example Processing System for Improved Timeline Management

Figure 8:
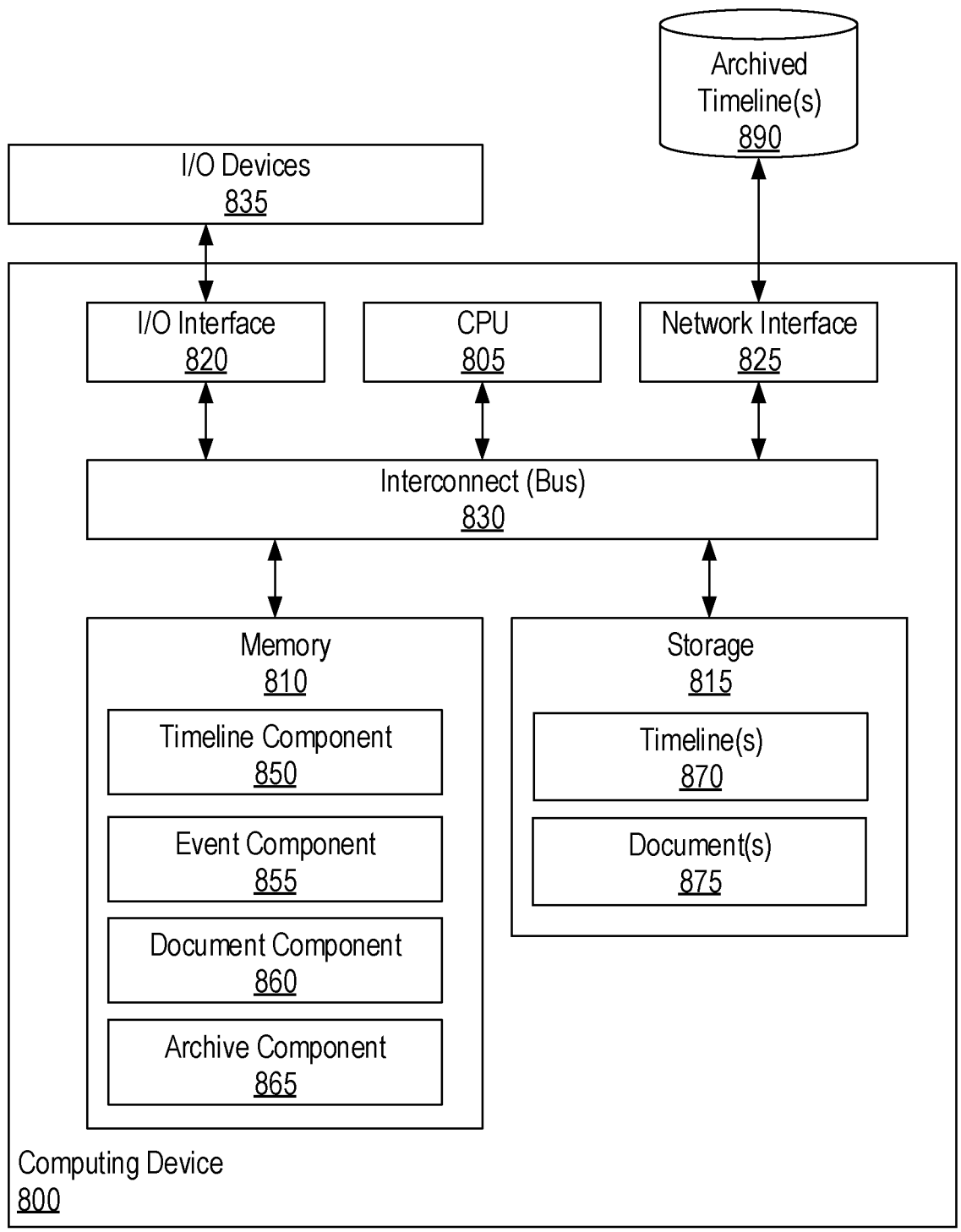
FIG. 8 depicts an example computing device configured to perform various aspects of the present disclosure.

FIG. 8 depicts an example computing device 800 configured to perform various aspects of the present disclosure. Although depicted as a physical device, in embodiments, the computing device 800 may be implemented using virtual device(s), and/or across a number of devices (e.g., in a cloud environment). In one embodiment, the computing device 800 corresponds to a transaction server, such as the transaction server 115 of FIG. 1.

As illustrated, the computing device 800 includes a CPU 805, memory 810, storage 815, a network interface 825, and one or more I/O interfaces 820. In the illustrated embodiment, the CPU 805 retrieves and executes programming instructions stored in memory 810, as well as stores and retrieves application data residing in storage 815. The CPU 805 is generally representative of a single CPU and/or GPU, multiple CPUs and/or GPUs, a single CPU and/or GPU having multiple processing cores, and the like. The memory 810 is generally included to be representative of a random access memory. Storage 815 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 835 (such as keyboards, monitors, etc.) are connected via the I/O interface(s) 820. Further, via the network interface 825, the computing device 800 can be communicatively coupled with one or more other devices and components (e.g., via a network, which may include the Internet, local network(s), and the like). As illustrated, the CPU 805, memory 810, storage 815, network interface(s) 825, and I/O interface(s) 820 are communicatively coupled by one or more buses 830.

In the illustrated embodiment, the memory 810 includes a timeline component 850, an event component 855, a document component 860, and an archive component 865, which may perform one or more embodiments discussed above. Although depicted as discrete components for conceptual clarity, in embodiments, the operations of the depicted components (and others not illustrated) may be combined or distributed across any number of components. Further, although depicted as software residing in memory 810, in embodiments, the operations of the depicted components (and others not illustrated) may be implemented using hardware, software, or a combination of hardware and software.

In one embodiment, the timeline component 850 is used to generate, search, merge, split, and otherwise maintain and manage timelines and the associated data, as discussed above. For example, the timeline component 850 may generate timelines based on user requests, merge timelines when submissions are accepted, push updates to affected users, and the like. The event component 855 may generally be used to generate or identify relevant events for timelines, as discussed above. For example, the event component 855 may identify a subset of alternative events that are relevant for a given timeline and/or context, add these events to the timeline, monitor completion or status updates for the events, and the like. The document component 860 may be configured to retrieve and output various user data, as discussed above. For example, the document component 860 may be used to identify, retrieve, and/or store data such as inspection reports. The archive component 865 is generally used to compress and/or archive timelines when they are closed (e.g., because a sale is completed, because the buyer decides not to pursue purchasing, because the seller decides to remove the property from the market, and the like), as discussed above.

In the illustrated example, the storage 815 includes timelines data 870 and documents 875. In one embodiment, the timelines 870 may correspond to the transaction data 125, and can generally include data such as unique identifiers for each timeline, corresponding clients or users, events associated with each timeline, and the like. The documents 875 may generally correspond to the transaction documents 130, and may include data such as inspection reports, survey results, and the like. Although depicted as residing in storage 815, the timelines 870 and documents 875 may be stored in any suitable location, including memory 810.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or systems (e.g., the transaction server 115 of FIG. 1) or related data available in the cloud. For example, the transaction server could execute on a computing system in the cloud and automatically manage data timelines. In such a case, the transaction server could generate, update, and merge timelines and tasks, and store the relevant data at a storage location in the cloud. Doing so allows a user to access this information from any computing system attached to a network connected to the cloud (e.g., the Internet).

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
in response to receiving a first request indicating that a first client desires to sell an asset indicated in the first request:
generating, by a transaction server, a seller timeline for the first client comprising a first set of events for the asset indicated in the first request, wherein:
the first set of events are generated, from a defined set of events, based on a role of the first client, and
each respective event in the defined set of events comprises a respective set of criteria indicating: (i) a transaction stage when the respective event is applicable, and (ii) a role for which the respective event is applicable; and
generating and adding a first unique identifier to the seller timeline;
in response to receiving a second request indicating that a second client desires to search for one or more assets for subsequent purchase:
generating, by the transaction server, a buyer timeline for the second client, distinct from the seller timeline, comprising a second set of events distinct from the first set of events, wherein the buyer timeline is maintained on the transaction server separately from the seller timeline on the transaction server; and
generating and adding a second unique identifier to the buyer timeline;
providing, to the first client and from the second client, a first submission for the asset, comprising updating a first graphical user interface (GUI) output on a first device of the first client;
in response to determining that the first client approved the first submission, generating, by the transaction server, a merged timeline based on the seller and buyer timelines, wherein the merged timeline comprises both the first and second sets of events, comprising:
adding the first unique identifier to the buyer timeline to point to the seller timeline;
adding the second unique identifier to the seller timeline to point to the buyer timeline;
generating a third set of events for the merged timeline based on a determined stage of the merged timeline;
updating the first GUI output on the first device to indicate the merged timeline; and
updating a second GUI output on a second device of the second client to indicate the merged timeline, comprising using a bidirectional communication protocol to automatically modify the second GUI using a push notification;
in response to determining that the merged timeline has reached a new stage, generating a fourth set of events for the merged timeline based at least in part on the new stage of the merged timeline;
updating the first GUI output on the first device to indicate a first subset of the fourth set of events based on the role of the first client; and
updating the second GUI output on the second device to indicate a second subset of the fourth set of events based on a role of the second client.

2. The method of claim 1, further comprising:
in response to receiving a document request for the merged timeline:
identifying a plurality of documents related to the first and second sets of events;
retrieving, by the transaction server, the plurality of documents from one or more storage repositories; and
generating an aggregate output based on the plurality of documents, comprising:
retrieving a summary template indicating a set of fields;
parsing the plurality of documents to retrieve information for each of the set of fields; and
generating a natural language summary of the merged timeline based on the summary template and the retrieved information.

3. The method of claim 1, wherein:
the first unique identifier is used as a timeline identifier for the seller timeline and as an alternative timeline identifier for the buyer timeline; and
the second unique identifier is used as a timeline identifier for the buyer timeline and as an alternative timeline identifier for seller buyer timeline.

4. The method of claim 1, further comprising:
determining that a first event of the first plurality of events has been completed;
updating the merged timeline based on completion of the first event; and updating the second GUI output on the second device based on the completion of the first event.

5. The method of claim 1, wherein:
the seller timeline comprises an asset identifier corresponding to the asset, and
generating the merged timeline further comprises adding the asset identifier to the buyer timeline.

6. The method of claim 1, further comprising:
in response to receiving a third request from a third client, generating, by the transaction server, a second buyer timeline comprising a third plurality of events;
providing, to the first client and from the third client, a second submission for the asset; and
in response to determining that the first client approved the first submission, updating a third GUI output on a third device of the third client, comprising:
identifying a set of submissions, including the second submission, specifying an asset identifier corresponding to the asset; and
automatically terminating each respective submission in the identified set of submissions.

7. The method of claim 1, further comprising:
in response to determining that the first submission has been completed:
compressing a plurality of documents related to the first and second set of events; and
archiving the merged timeline, including the compressed plurality of documents, comprising transferring data related to the seller and buyer timelines to a secondary storage repository.

8. A non-transitory computer-readable storage medium comprising computer-readable program code that, when executed using one or more computer processors, performs an operation comprising:
in response to receiving a first request indicating that a first client desires to sell an asset indicated in the first request:
generating, by a transaction server, a seller timeline for the first client comprising a first set of events for the asset indicated in the first request, wherein:
the first set of events are generated, from a defined set of events, based on a role of the first client, and each respective event in the defined set of events comprises a respective set of criteria indicating: (i) a transaction stage when the respective event is applicable, and (ii) a role for which the respective event is applicable; and
generating and adding a first unique identifier to the seller timeline;
in response to receiving a second request indicating that a second client desires to search for one or more assets for subsequent purchase:
generating, by the transaction server, a buyer timeline for the second client, distinct from the seller timeline, comprising a second set of events distinct from the first set of events, wherein the buyer timeline is maintained on the transaction server separately from the seller timeline on the transaction server; and
generating and adding a second unique identifier to the buyer timeline;
providing, to the first client and from the second client, a first submission for the asset, comprising updating a first graphical user interface (GUI) output on a first device of the first client;
in response to determining that the first client approved the first submission, generating, by the transaction server, a merged timeline based on the seller and buyer timelines, wherein the merged timeline comprises both the first and second sets of events, comprising:
adding the first unique identifier to the buyer timeline to point to the seller timeline;
adding the second unique identifier to the seller timeline to point to the buyer timeline;
generating a third set of events for the merged timeline based on a determined stage of the merged timeline;
updating the first GUI output on the first device to indicate the merged timeline; and
updating a second GUI output on a second device of the second client to indicate the merged timeline, comprising using a bidirectional communication protocol to automatically modify the second GUI using a push notification;
in response to determining that the merged timeline has reached a new stage, generating a fourth set of events for the merged timeline based at least in part on the new stage of the merged timeline;
updating the first GUI output on the first device to indicate a first subset of the fourth set of events based on the role of the first client; and
updating the second GUI output on the second device to indicate a second subset of the fourth set of events based on a role of the second client.

9. The non-transitory computer-readable storage medium of claim 8, the operation further comprising:
in response to receiving a document request for the merged timeline:
identifying a plurality of documents related to the first and second sets of events;
retrieving, by the transaction server, the plurality of documents from one or more storage repositories; and
generating an aggregate output based on the plurality of documents, comprising:
retrieving a summary template indicating a set of fields;
parsing the plurality of documents to retrieve information for each of the set of fields; and
generating a natural language summary of the merged timeline based on the summary template and the retrieved information.

10. The non-transitory computer-readable storage medium of claim 8, wherein:
the first unique identifier is used as a timeline identifier for the seller timeline and as an alternative timeline identifier for the buyer timeline; and
the second unique identifier is used as a timeline identifier for the buyer timeline and as an alternative timeline identifier for seller buyer timeline.

11. The non-transitory computer-readable storage medium of claim 8, the operation further comprising:
determining that a first event of the first set of events has been completed;
updating the merged timeline based on completion of the first event; and
updating the second GUI output on the second device based on the completion of the first event.

12. The non-transitory computer-readable storage medium of claim 8, the operation further comprising:
in response to determining that the first submission has been completed:
compressing a plurality of documents related to the first and second sets of events; and
archiving the merged timeline, including the compressed plurality of documents, comprising transferring data related to the first and second timelines to a secondary storage repository.

13. A system comprising:
one or more computer processors; and
logic encoded in a non-transitory medium, the logic executable by operation of the one or more computer processors to perform an operation comprising:
in response to receiving a first request indicating that a first client desires to sell an asset indicated in the first request:
generating, by a transaction server, a seller timeline for the first client comprising a first set of events for the asset indicated in the first request, wherein:
the first set of events are generated, from a defined set of events, based on a role of the first client, and
each respective event in the defined set of events comprises a respective set of criteria indicating: (i) a transaction stage when the respective event is applicable, and (ii) a role for which the respective event is applicable; and
generating and adding a first unique identifier to the seller timeline;
in response to receiving a second request indicating that a second client desires to search for one or more assets for subsequent purchase:
generating, by the transaction server, a buyer timeline for the second client, distinct from the seller timeline, comprising a second set of events distinct from the first set of events, wherein the buyer timeline is maintained on the transaction server separately from the seller timeline on the transaction server; and
generating and adding a second unique identifier to the buyer timeline;
providing, to the first client and from the second client, a first submission for the asset, comprising updating a first graphical user interface (GUI) output on a first device of the first client;
in response to determining that the first client approved the first submission, generating, by the transaction server, a merged timeline based on the seller and buyer timelines, wherein the merged timeline comprises both the first and second sets of events, comprising:
adding the first unique identifier to the buyer timeline to point to the seller timeline;
adding the second unique identifier to the seller timeline to point to the buyer timeline;
generating a third set of events for the merged timeline based on a determined stage of the merged timeline;
updating the first GUI output on the first device to indicate the merged timeline; and
updating a second GUI output on a second device of the second client to indicate the merged timeline, comprising using a bidirectional communication protocol to automatically modify the second GUI using a push notification;
in response to determining that the merged timeline has reached a new stage, generating a fourth set of events for the merged timeline based at least in part on the new stage of the merged timeline;
updating the first GUI output on the first device to indicate a first subset of the fourth set of events based on the role of the first client; and
updating the second GUI output on the second device to indicate a second subset of the fourth set of events based on a role of the second client.

14. The system of claim 13, the operation further comprising:
in response to receiving a document request for the merged timeline:
identifying a plurality of documents related to the first and second sets of events;
retrieving, by the transaction server, the plurality of documents from one or more storage repositories; and
generating an aggregate output based on the plurality of documents, comprising:
retrieving a summary template indicating a set of fields;
parsing the plurality of documents to retrieve information for each of the set of fields; and
generating a natural language summary of the merged timeline based on the summary template and the retrieved information.

15. The system of claim 13, wherein:
the first unique identifier is used as a timeline identifier for the seller timeline and as an alternative timeline identifier for the buyer timeline; and
the second unique identifier is used as a timeline identifier for the buyer timeline and as an alternative timeline identifier for seller buyer timeline.

16. The system of claim 13, the operation further comprising:
in response to determining that the first submission has been completed:
compressing a plurality of documents related to the first and second sets of events; and
archiving the merged timeline, including the compressed plurality of documents, comprising transferring data related to the first and second timelines to a secondary storage repository.

* * * * *